H. B. GARMAN.
TRANSMISSION.
APPLICATION FILED AUG. 1, 1919.

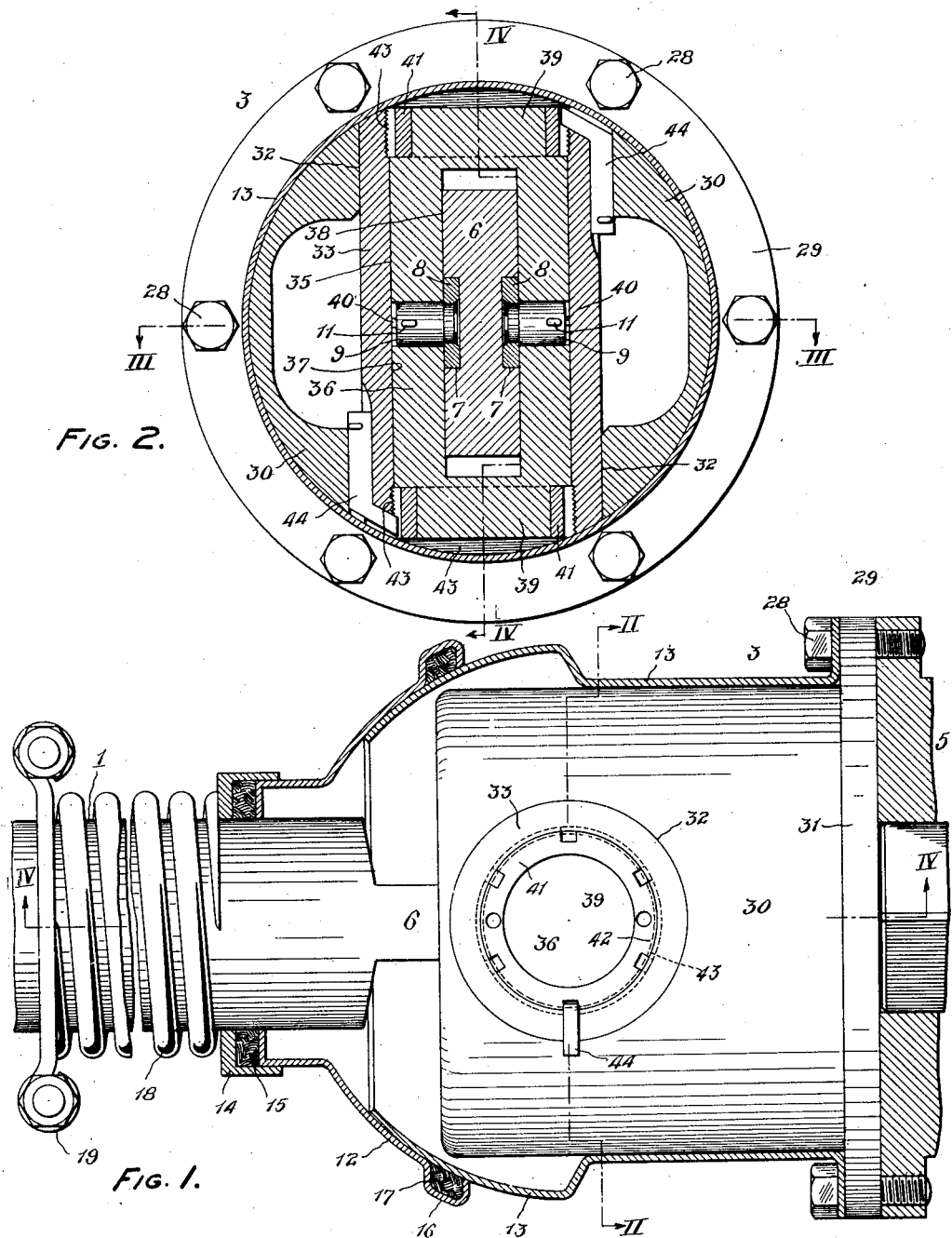

1,348,166.

Patented Aug. 3, 1920.
3 SHEETS—SHEET 2.

INVENTOR:
HARRY B. GARMAN

BY
Frease, Merkel and Saywell
ATTORNEYS

H. B. GARMAN.
TRANSMISSION.
APPLICATION FILED AUG. 1, 1919.
1,348,166.
Patented Aug. 3, 1920.
3 SHEETS—SHEET 3.
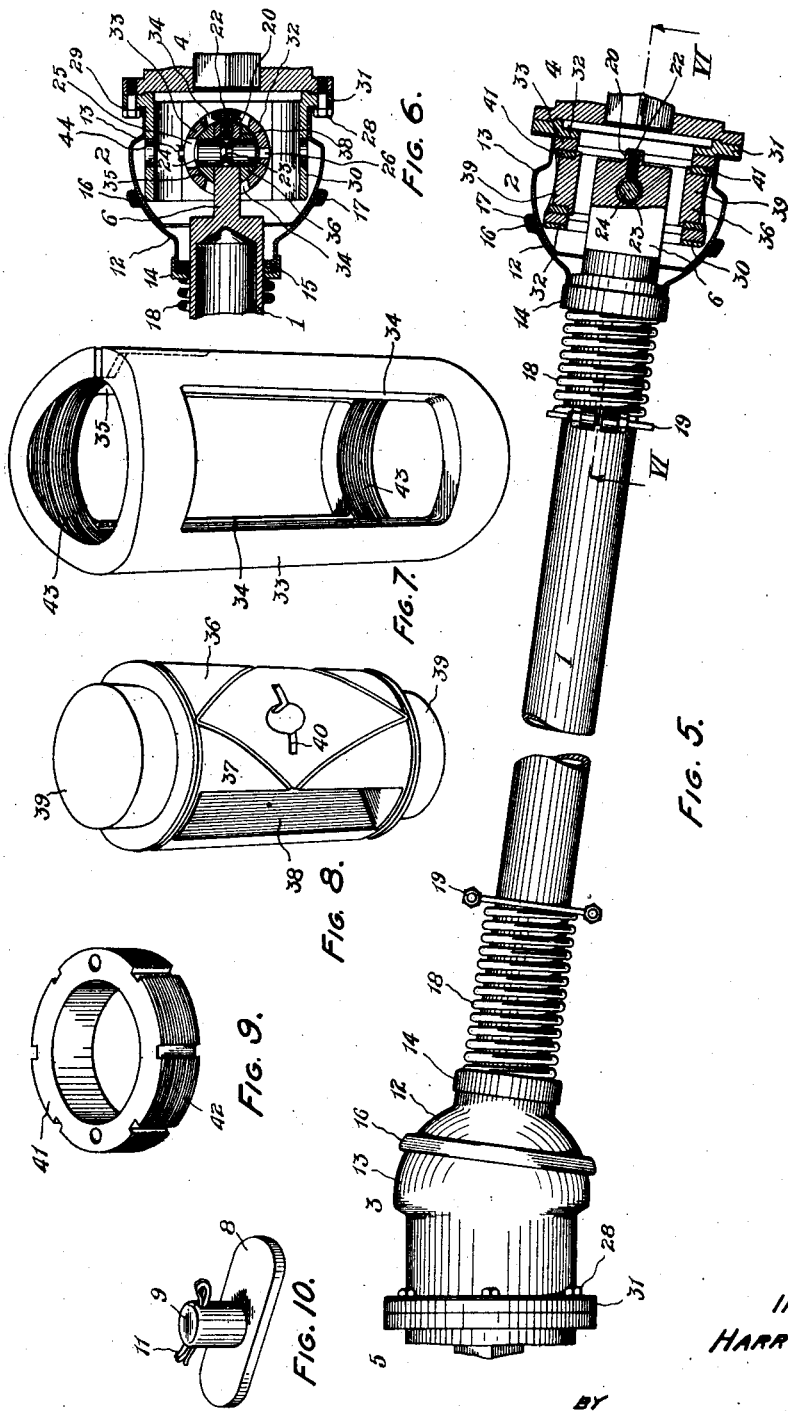
INVENTOR:
HARRY B. GARMAN
BY Frease, Merkel and Saywell
ATTORNEYS

UNITED STATES PATENT OFFICE.

HARRY B. GARMAN, OF DETROIT, MICHIGAN, ASSIGNOR TO CHARLES E. THOMPSON, OF CLEVELAND, OHIO.

TRANSMISSION.

1,348,166.  Specification of Letters Patent.  Patented Aug. 3, 1920.

Application filed August 1, 1919. Serial No. 314,743.

*To all whom it may concern:*

Be it known that I, HARRY B. GARMAN, a citizen of the United States, resident of Detroit, county of Wayne, and State of Michigan, have invented new and useful Improvements in Transmissions, of which the following is a specification, the principle of the invention being herein explained and the best mode in which I have contemplated applying that principle, so as to distinguish it from other inventions.

My invention relates to transmissions, and particularly to devices of that character designed for use in passenger automobiles and automobile trucks. Particularly does this invention relate to transmissions in which the standard spline, provided for automatically adjusting the center distance when under load, is eliminated, and this function performed by a novel construction hereinafter fully described and claimed, and shown in the accompanying drawings. The invention also relates to new and improved constructions in universal joints.

The annexed drawings and the following description set forth in detail certain means embodying my invention, the disclosed means, however, constituting but one of the various mechanical forms in which the principle of the invention may be applied.

In said annexed drawings:

Figure 1 represents a fragmentary plan view of my improved transmission, a housing for one of the joints thereof being shown in section;

Fig. 2 represents a transverse vertical section taken in the planes indicated by the lines II—II, Figs. 1 and 4;

Figure 3:
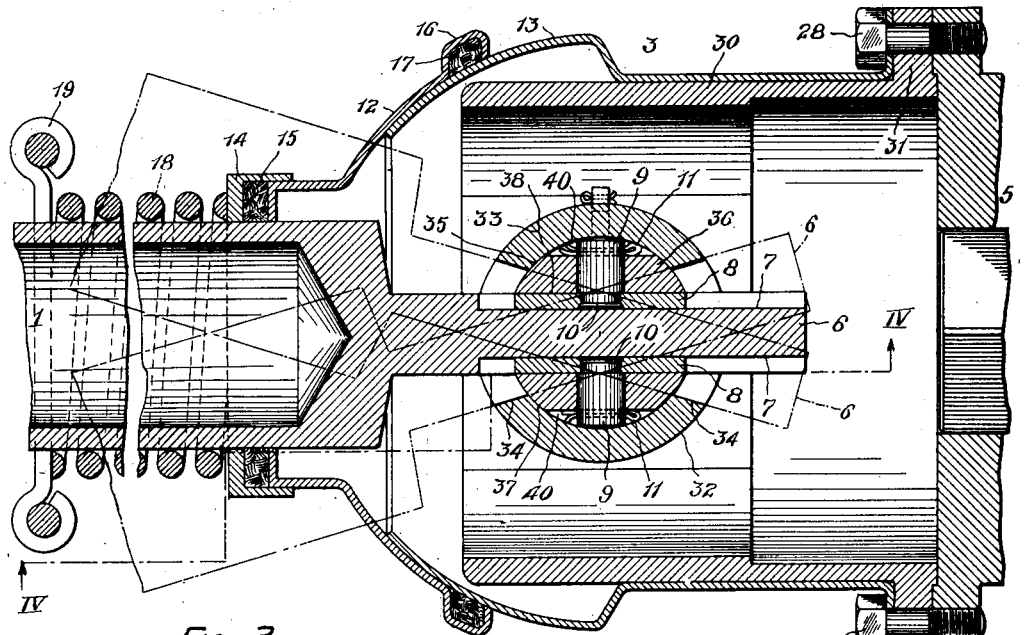
Fig. 3 represents a longitudinal horizontal section taken in the plane indicated by the line III—III, Fig. 2.
Figure 4:
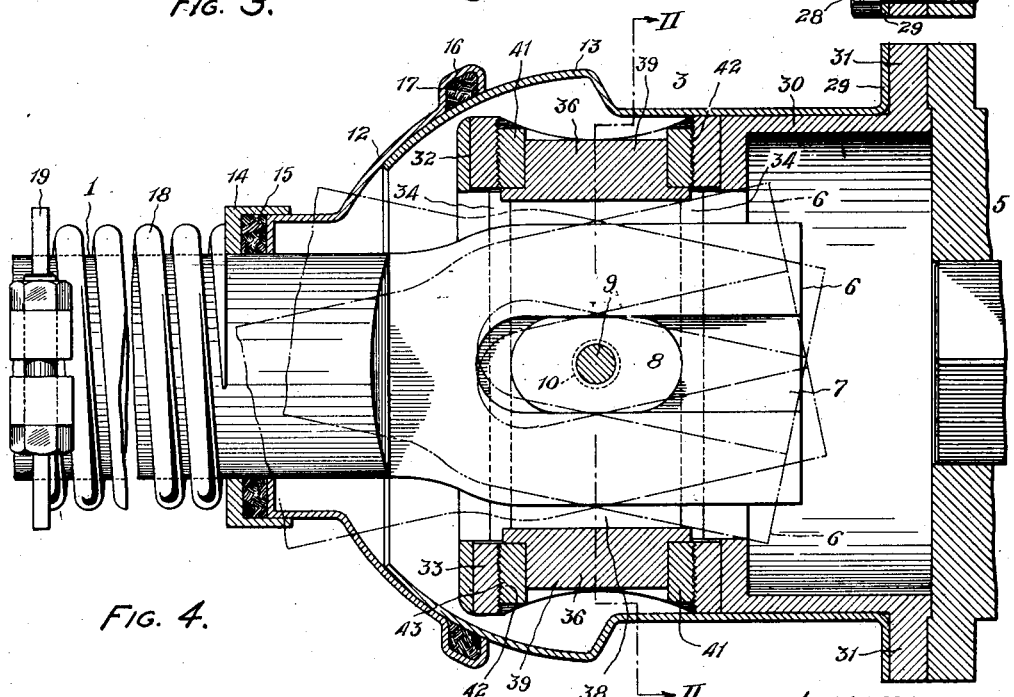
Fig. 4 represents a longitudinal vertical section taken in the plane indicated by the line IV—IV, Fig. 2.

Fig. 5 represents a side elevation of the improved transmission, one of the universal joints being of the improved design and allowing for automatic longitudinal adjustment described and the other of said joints being a fixed joint containing some improved features and some features indentical with those of a joint forming the subject-matter of my pending application for U. S. Letters Patent, Serial No. 302,379;

Fig. 6 represents a horizontal longitudinal section of said fixed joint;

Figs. 7, 8, 9 and 10 represent perspective views of an extra casing, a rocker, a plug, and an assembly plate and rivet pin, respectively, all forming details of my improved joint.

Referring to the annexed drawings, a hollow driving shaft is indicated by the ordinal 1 to which is secured at one end a fixed joint 2, and at the other end a relatively movable joint 3, said fixed jont being in turn secured to the rear axle drive indicated generally by the ordinal 4 and said movable joint to the change-gear set indicated generally by the ordinal 5. Said driving shaft 1 is formed at each end with a reduced tongue portion 6 pivotally mounted relatively to certain joint elements, as hereinafter fully described.

Referring to the relatively movable joint 3, it will be noted that the tongue 6 of the driving shaft is provided with elongated slots 7 formed in its side faces. There are provided and connected to the other joint parts, two plates 8 adapted to slide in said slots 7, whereby the relative longitudinal disposition of the joint 3 and the driving shaft 1 can change automatically to provide for the varying center distances when under load. These sliding plates 8 are rotatably mounted upon rivet pins 9 secured in and projecting interiorly of a rocker 36 hereinafter fully described. Said rivet pins 9 extend into suitable holes formed through the sliding plates 8, said holes being enlarged at their inner ends so that the projecting heads of the rivet pins 9 can be upset in the enlarged portion 10 of said holes and be disposed therein in a countersunk condition. The rivet pins 9 are secured in the rockers 36 by suitable cotter pins 11, the rockers 36 being provided with suitable grooved portions 40 to accommodate said cotter pins 11.

I provide housings for the joints of my improved transmission, the same form of housing serving both for the movable and fixed joints, and consisting of a member 12 formed to receive and inclose the end of the driving shaft 1, said housing member 12 at its other end inclosing one end of a second housing member 13 which incloses the joint features proper, a suitable washer 14 and contained packing 15 providing a tight joint at the outer end of the housing member 12. A tight joint is provided for the overlapping ends of the housing members 12 and 13 by the cap 16 and the contained packing 17. The housing member 12 is held to position by means of a spring 18 rigidly secured by means of the clamps 19 at one end to the exterior surface of the driving shaft 1 and bearing at its other end against the washer 14 which also forms a spring seat.

The elements of my improved transmission adapted to be directly secured to the rear axle drive and the change-gear set are casings indicated by the ordinal 30, it not being necessary to harden said casings 30 because of the provision of auxiliary casings, hereinafter fully described, which are suitably hardened and ground. Describing the change-gear connection only, the casing 30 is adapted to be secured by a flange portion 31 to the flange of a hub member secured to the change-gear drive, cap screws 28 being utilized for this purpose. The member 30 is formed with a cylindrical bore 32 within which is secured an extra steel bushing or casing 33 suitably hardened and ground. This casing 33 is formed with elongated holes 34 adapted to receive the tongues 6 of the driving shaft 1. The casing 33 is formed with interior bearing surfaces 35 adapted to coöperate with journal surfaces 37 of a bronze plug or rocker 36, said rocker 36 being formed with elongated holes 38 also to accommodate the tongue 6. The rocker 36 is formed with reduced end portions 39 and disposed intermediately of the same and the ends of the cylindrical bore of the casing 33 are plugs 41 formed with externally screw-threaded portions 42 adapted to coöperate with internally threaded portions 43 of said casing 33. Suitable keys 44 serve to keep the ends of the plugs 41 from backing out of position and also serve to hold the extra steel casing 33 rigidly in the outer joint casing 30.

The housing member 13 is formed with a marginal flange 29 securely fastened to the flange 31 of the joint casing 30 by means of the cap screws 28.

The fixed joint end comprises the casing 30 and related members 33, 36 and 41 heretofore described but, inasmuch as no provision is made at this end of the shaft for automatically caring for the varying center distances, the sliding plates 8 and related elements are omitted and the connection of the joint 2 with the shaft is similar to that shown and described in detail and claimed in my pending application for U. S. Letters Patent Serial No. 302,379. Briefly, these elements comprise a pin 24 upon which the tongue 6 is mounted, said pin being inserted through a suitable hole 25 in the casing 33 and disposed in suitable holes in the rocker 36, a hole 26 being provided in the opposite side of the casing 33 to enable the pin 24 to be driven out. The end of the tongue 6 is formed with a reduced projecting portion 20 which is intersected by a suitable screw 22 whose inner end seats in a circumferential groove 23 formed in the pin 24.

The joint casing elements 12, against the action of the springs 18, may be manually pulled back from the casing elements 13 to allow lubricant to be squirted into the joints. It will be noted that the casing, housing, and spring, at the fixed joint end, are all shorter than the corresponding elements at the adjustable joint end, the differences in length of the respective elements being substantially that represented by the amount of adjustability at the moving end.

I wish particularly to point out that the rocking of the tongue 6 at the adjustable joint end takes place on only the very small surface represented by the reduced end portion of the rivet pins 9, which extend into the sliding plates 8.

The construction hereinbefore described, shown in the accompanying drawings and hereinafter claimed provides, through the medium of the slotted shaft and the relatively movable joint elements therein, the automatic relative adjustability of the shaft and coupling necessitated by the bearing thrusts when under load, without use of the standard spline.

What I claim is:

1. In a transmission, the combination of driving and driven members; an intermediate universal joint comprising an element supported by one of said members and adapted to rock in one plane relatively thereto, and a second joint element adapted to rock in a transverse plane; means for pivotally securing together said joint elements; and means, in combination with the last-mentioned means, for pivotally securing together said first-mentioned joint element and the other member, and for securing together said member and the second-mentioned joint element so that they rock together and are relatively longitudinally movable.

2. In a transmission, the combination of a driving shaft provided with a section having an elongated slot; a universal joint element pivotally supported by transmission members such as the change-gear set; a second joint element movable longitudinally of said driving shaft in the elongated slot thereof; and means relatively pivotally securing together said joint elements, said means also pivotally securing said driving shaft to said first joint element.

3. In a transmission, the combination of a driving shaft provided with a section having an elongated slot; a universal joint element adapted to be secured to transmission elements such as the change-gear set; a second universal joint element adapted to rock relatively to said first-mentioned joint element; a third joint element movable longitudinally of said driving shaft in the elongated slot thereof; and means relatively pivotally securing said second and third joint elements, said means also pivotally securing said driving shaft to said second joint element.

4. In a transmission, the combination of a driving shaft provided with a section having an elongated slot; a universal joint element adapted to be secured to transmission elements such as the change-gear set; a second universal joint element adapted to rock relatively to said first-mentioned joint element; and means adapted to guide said two joint elements longitudinally relatively to said elongated slot, said guiding means being fixed longitudinally and connected pivotally relatively to said joint elements, and automatically adjustable longitudinally relatively to said driving shaft and secured to the latter so as to rock therewith.

5. In a transmission, the combination of a driving shaft provided with elongated slots; transmission elements such as the change-gear set; a universal joint element secured to said transmission elements; a second joint element supported by said first joint element and adapted to rock relatively to the same; and a third joint element supported in the elongated slots of the driving shaft and secured to said second joint element, said second and third elements having coöperating sliding surfaces, said driving shaft being pivotally mounted relatively to said second joint element and automatically adjusting itself longitudinally relatively to said joint elements by means of said elongated slots.

6. In a transmission, the combination of a driving shaft provided with a tongue portion having an elongated slot formed in the lateral surface thereof; transmission elements such as the change-gear set and a joint element secured to the latter and provided with a bearing surface; a second joint element formed with a coöperating journal surface; means for pivotally mounting said driving shaft tongue portion in said second joint element; and a third joint element mounted in and movable relatively to said elongated slot and pivotally mounted relatively to said second joint element by the means relatively mounting the latter and said driving shaft, said driving shaft automatically adjusting itself relatively to the joint by means of said elongated slot.

7. In a transmission, the combination of a driving shaft provided with a section having elongated slots formed in the lateral surfaces thereof; a casing adapted to be secured to transmission elements such as the change-gear set and formed with a longitudinal bore; a hardened and ground auxiliary casing secured in said bore and having an inner bearing surface; a joint element mounted within said auxiliary casing and having coöperating journal surfaces, the portion of said driving shaft formed with said slots being adapted to intersect said auxiliary casing and joint element; plates mounted to slide longitudinally of said driving shaft in said slots; and means securing said plates to said joint element, said means also pivotally mounting said driving shaft and plates relatively to said joint element.

8. In a transmission, the combination of a pair of transmission elements such as the change-gear set and the rear axle drive and an intermediately disposed driving shaft; a pair of universal joints respectively disposed intermediately said driving shaft and said transmission elements, said joints each including a casing secured to a transmission element, a hardened and ground auxiliary casing secured within said first-mentioned casing and provided with an inner bearing surface, an element mounted in said auxiliary casing and having coöperating journal surfaces, and means pivotally mounting said driving shaft relatively to said element, the last-mentioned means which forms part of the joint contiguously to the change-gear set also allowing for the relative longitudinal movement of said joint and driving shaft.

9. In a transmission, the combination of a driving shaft provided with a tongue portion having an elongated slot; transmission elements such as the change-gear set, and a joint element secured to the latter and provided with a bearing surface; a second joint element formed with a coöperating journal surface; means for pivotally mounting said driving shaft tongue portion relatively to said second joint element and upon a rocking surface of small diameter; and a third joint element mounted in and movable relatively to said elongated slot and pivotally mounted relatively to said second joint element, said driving shaft automatically adjusting itself relatively to the joint by means of said elongated slot.

Signed by me, this 30th day of June, 1919.

HARRY B. GARMAN.